United States Patent [19]
Maruno et al.

[11] Patent Number: 5,204,378
[45] Date of Patent: Apr. 20, 1993

[54] FLUORINE-CONTAINING EPOXY(METH)ACRYLATE RESIN ADHESIVE CURED IN PRESENCE OF PHOTOINITIATOR

[75] Inventors: Tohru Maruno; Shigeki Ishibashi, both of Tokorozawa; Kouzaburou Nakamura, Tokyo, all of Japan

[73] Assignee: Nippon Telegraph and Telephone Corporation, Tokyo, Japan

[21] Appl. No.: 672,022

[22] Filed: Mar. 18, 1991

Related U.S. Application Data

[63] Continuation of Ser. No. 332,381, Apr. 3, 1989, Pat. No. 5,068,261, which is a continuation of Ser. No. 29,644, Mar. 24, 1987, abandoned.

[30] Foreign Application Priority Data

| Mar. 24, 1986 | [JP] | Japan | 61-64000 |
| May 13, 1986 | [JP] | Japan | 61-107675 |
| Oct. 7, 1986 | [JP] | Japan | 61-237004 |
| Oct. 17, 1986 | [JP] | Japan | 61-246849 |

[51] Int. Cl.$^5$ .................. C08F 2/50; C08G 20/06
[52] U.S. Cl. .................. 522/39; 522/43; 522/44; 522/46; 522/100; 525/531
[58] Field of Search ............ 522/39, 43, 44, 46, 522/100; 525/531; 526/246

[56] References Cited

U.S. PATENT DOCUMENTS

| 4,113,592 | 9/1978 | Rybny et al. | 525/531 |
| 4,113,593 | 9/1978 | Barzynski et al. | 525/531 |
| 4,129,486 | 12/1978 | Deutsch et al. | 525/531 |
| 4,129,609 | 12/1978 | Awaji et al. | 525/531 |
| 4,134,813 | 1/1978 | Kuesters et al. | 525/531 |
| 4,284,747 | 8/1981 | Griffith et al. | 525/531 |
| 4,591,627 | 5/1986 | Maruno et al. | 528/87 |
| 5,068,261 | 11/1991 | Maruno et al. | 522/100 |

FOREIGN PATENT DOCUMENTS 61-123609 6/1986 Japan .................. 526/246

*Primary Examiner*—Robert E. Sellers
*Attorney, Agent, or Firm*—Oblon, Spivak, McClelland, Maier & Neustadt

[57] ABSTRACT

The fluorine-containing epoxy(meth)acrylate resin of the invention is represented by the following general formula (I).

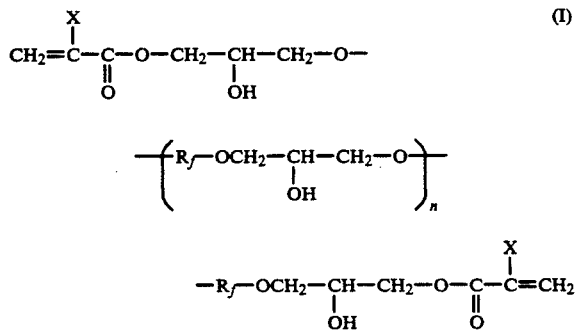

wherein $R_f$ is selected from the group consisting of $-\phi-C(CF_3)_2-\phi-$ (where $\phi$ stands for

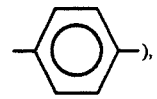

$-C(CF_3)_2-\phi'-C(CF_3)_2-$ (where $\phi'$ stands for

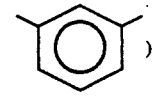

and $-CH_2(CF_2)_6CH_2-$; n is zero or a positive interger; and X is hydrogen or methyl group. The resin of the invention may be prepared by reacting a diglycidyl ether of a fluorine-containing hydrocarbon ($R_f$) with acrylic acid or methacrylic acid. Further provided is an adhesive composition comprising the aforementioned fluorine-containing epoxy(meth)acrylate resin and a photo-polymerization initiator, which can be cured at room temperature within a short time by irradiation (Abstract continued on next page.)

with UV rays to form a cured product having a refractive index $N_D^{20}$ ranging from 1.434 to 1.532. The adhesive composition of the invention has a particular utility when used to form a part or zone contacting with a quartz glass or glass fibers, since it is improved in matching of the refractive index with those of the quartz glass and optical fibers.

2 Claims, 5 Drawing Sheets

FLUORINE-CONTAINING EPOXY(METH)ACRYLATE RESIN ADHESIVE CURED IN PRESENCE OF PHOTOINITIATOR

This is a continuation of application Ser. No. 07/332,381, filed on Apr. 3, 1989, now U.S. Pat. No. 5,068,261, which is a continuation of abandoned application Ser. No. 07/029,644, filed Mar. 24, 1987.

BACKGROUND OF THE INVENTION

1. Field of the Invention

The present invention relates to a novel fluorine-containing epoxy acrylate resin and fluorine-containing epoxy methacrylate resin (hereinafter referred to inclusively as "fluorine-containing epoxy(meth)acrylate resin"), a process for preparing the same and an adhesive composition containing the fluorine-containing epoxy(meth)acrylate resin. More particularly, the adhesive composition provided by this invention has a refractive index which may be controlled to a desired value, and a cured mass excellent in adhesiveness and mechanical properties. A more characteristic merit of the adhesive composition of the invention resides in that the fluorine-containing epoxy(meth)acrylate resin contained as a curable component is cured at room temperature within a short time under irradiation with UV (ultraviolet) rays.

2. Prior Art Statement

With the progress of the optical communication systems, epoxy resins have been increasingly used in the instruments used in such systems. To improve the adaptability of the epoxy resins for such applications, it is requested that the epoxy resins used for such purpose should have the following properties:

(1) The resin should have a low refractive index to match with the refractive index of an optical member made of glass or a like material; and (2) The resin could be cured at a low temperature to obviate adverse influences of heating on the optical members otherwise occurred if the resin would be cured at a high temperature during the operation for curing the resin for binding the optical members U.S. Pat. No. 4,591,627 discloses an adhesive composition composed of a fluorine-containing epoxy resin, a reactive diluent containing fluorine and a hardner or curing agent containing fluorine. The adhesive composition taught by this prior patent has a refractive index which may be discretionally selected within a range of from 1.415 to 1.57, and is improved in thermal stability and adhesiveness. The merit achieved by the use of the composition as an adhesive for binding optical members, such as glass fibers or optical glasses, is remarkable due to its adaptability for matching the refractive index with those of the associated optical members. However, the adhesive composition taught by this reference cannot be cured at room temperature, the condition required for curing the same being 90° C. for 4 hours or 60° C. for 15 hours. On the other hand, it has been known in the art that an epoxyacrylate resin introduced with an ethylenically unsaturated group is excellent in adhesiveness and resistance to heat. It is also known that such a known epoxyacrylate resin has a photosensitivity due to the presence of the ethylenically unsaturated group, and may be cured at room temperature upon irradiation with UV rays. Making use of this advantageous property, the epoxy acrylate resins introduced with ethylenically unsaturated groups have been used as photo-curable adhesives or in photo-curable paints However, these known epoxy acrylate resins have refractive indices of from 1.53 to 1.60 which are substantially equivalent to those of the ordinary epoxy resins containing no fluorine atoms.

OBJECTS AND SUMMARY OF THE INVENTION

Accordingly, a first object of this invention is to provide a novel epoxy(meth)acrylate resin containing intramolecular fluorine atoms (which will be simply referred to as "fluorine-containing epoxy(meth)acrylate resin" throughout the specification and claims) having a low refractive index, and to provide a process for preparing such a resin.

A second object of this invention is to provide a novel adhesive composition including a fluorine-containing epoxy(meth)acrylate resin as the main ingredient, the composition being superior over those mainly composed of the conventional fluorine-containing epoxy resins in that it is curable at a low temperature within a short time and the composition being more conveniently used in optical instruments than the adhesive compositions mainly composed of the conventional epoxyacrylate resins in that it has a low refractive index. The fluorine-containing epoxy(meth)acrylate resin, provided in accordance with the present invention, is represented by the following general formula (I) of:

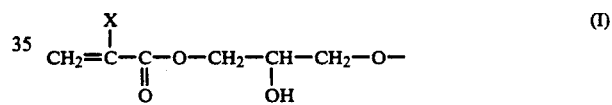

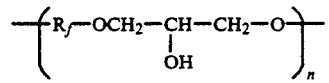

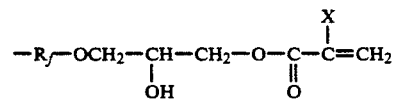

wherein $R_f$ is selected from the group consisting of
—φ—C(CF$_3$)$_2$—φ'—(where φ stands for

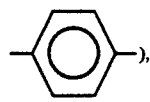

—C(CF$_3$)$_2$—φ'—C(CF$_3$)$_2$—(where φ' stands for

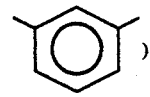

and —CH$_2$(CF$_2$)$_6$CH$_2$—; n is zero or a positive integer; and X is hydrogen or methyl group.

Also provided by the present invention is a process for preparing a fluorine-containing epoxy(meth)acrylate resin represented by the following general formula (I) of:

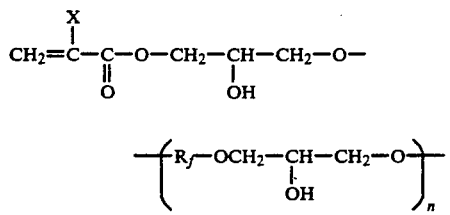
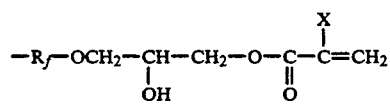
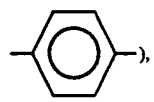

wherein $R_f$ is selected from the group consisting of —φ—C(CF$_3$)$_2$—φ—(where φ stands for

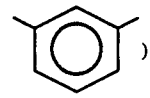

—C(CF$_3$)$_2$—φ'—C(CF$_3$)$_2$—(where φ' stands for and —CH$_2$(CF$_2$)$_6$CH$_2$—; n is zero or a positive interger; and X is hydrogen or methyl group;

comprising the step of reacting a diglycidyl ether of a fluorine-containing hydrocarbon (R$_f$) with at least one of acrylic acid and methacrylic acid in the presence of a compound selected from the group consisting of tertiary amines and quarternary amines and mixtures thereof, said diglycidyl ether of said fluorine-containing hydrocarbon (R$_f$) being represented by the following general formula (II) of:

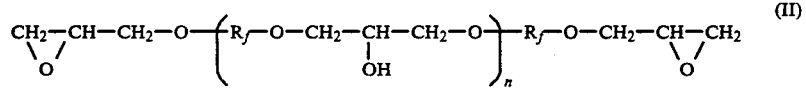

wherein $R_f$ is selected from the group consisting of —φ—C(CF$_3$)$_2$—φ—(where φ stands for

—C(CF$_3$)$_2$—φ'—C(CF$_3$)$_2$—(where φ stands for

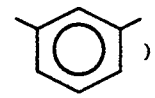

and —CH$_2$(CF$_2$)$_6$CH$_2$—; and n is zero or a positive interger.

The adhesive composition, according to the present invention, comprises a photo polymerization initiator and a fluorine-containing epoxy (meth)acrylate resin represented by the following general formula (I) of:

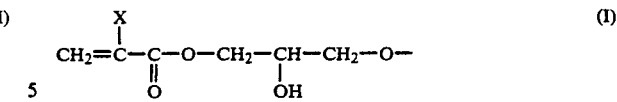
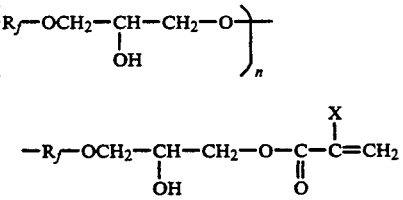

wherein $R_f$ is selected from the group consisting of —φ—C(CF$_3$)$_2$—φ—(where φ stands for

—C(CF$_3$)$_2$—φ'—C(CF$_3$)$_2$—(where φ' stands for

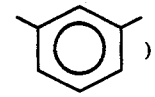

and —CH$_2$(CF$_2$)$_6$CH$_2$—; n is zero or a positive interger; and X is hydrogen or methyl group.

DESCRIPTION OF PREFERRED EMBODIMENTS

Figure 1:
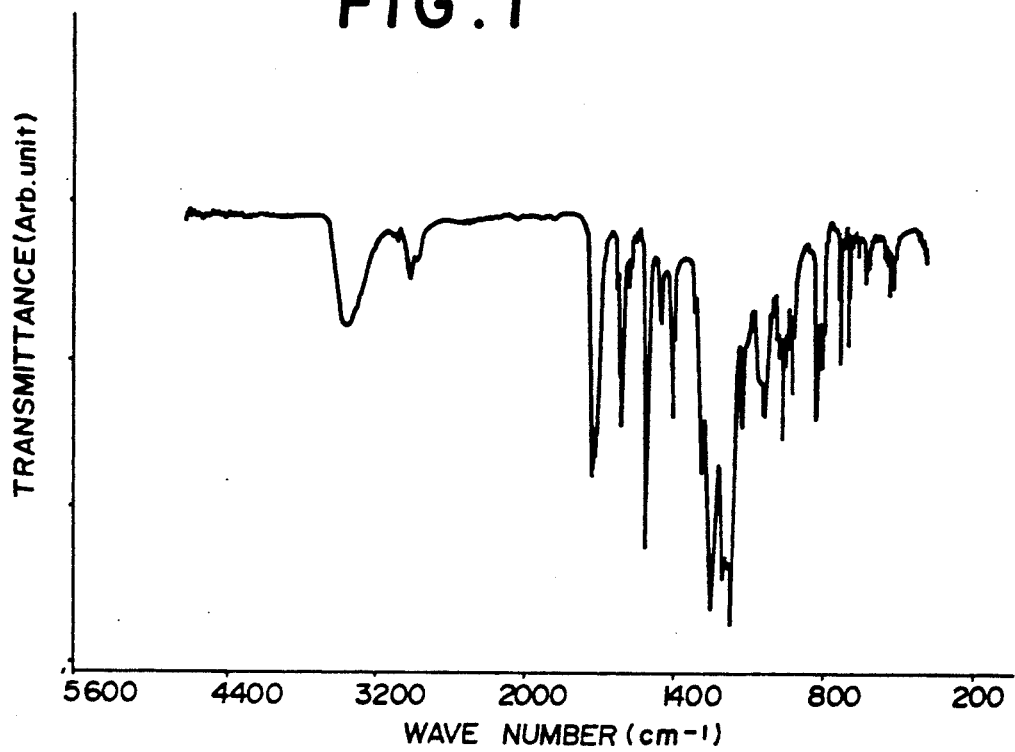
FIG. 1 is an infrared absorption spectrum chart of a bisphenol-AF epoxyacrylate (AFGA)

The most important feature for achieving the objects of the present invention resides in that an epoxy resin containing fluorine atoms is used as a starting material for the epoxy(meth)acrylate resin. As the results of the very fact that the epoxy(meth)acrylate resin contains fluorine atoms, it forms a cured product having a lower refractive index as compared to those of the conventional epoxy(meth)acrylate resins and thus improved remarkedly in matching of the refractive index with those of the optical fibers and quartz glass. The fluorine-containing epoxy resins (diglycidyl ethers) II, which may be used as the starting materials for the epoxy(meth)acrylate resins of the invention, may be be prepared by reacting the corresponding fluorine-containing diols with epichlorohydrin. An example of the known processes which may be utilized for the preparation of the fluorine-containing epoxy resins II is a process wherein benzyltrimethylammonium chloride is used as a catalyst, as disclosed by A. L. Cupples, "Advan. Chem. Ser."Vol 92, pp 173 to 207 (1970).

In the reaction between the fluorine-containing epoxy resin and acrylic acid or methacrylic acid, it is preferred that 2 to 10 mols of acrylic acid or methacrylic acid is used per 1 mol of the epoxy resin. The reaction rate may be increased by the addition of a catalyst, for example, a compound selected from tertiary amines, such as triethylamine and trimethylamine, and quarternary ammonium salts, such as benzyltriethylammonium chloride and tetrabutylammonium bromide. In order to inhibit thermal polymerization of acrylic acid or methacrylic acid during this step, it is desirous that a thermal polymerization inhibitor, such as hydroquinone, quinone or tert-butyl pyrocatechol, is added to the reaction system. The fluorine-containing epoxy(meth)acrylate resins, provided in accordance with the present invention, is cured simply by irradiation with UV rays. However, a resin composition having a more sensitive photo-curable property may be prepared by the addition of a photo polymerization initiator or a sensitizer. Examples of the additives acting as a photo polymerization initiator or a sensitizer include benzoin ethyl ether, benzoin isobutyl ether, benzophenone, benzyl dimethyl ketal and Michler's ketone.

The adhesive composition, according to the present invention, comprises the fluorine-containing epoxy(meth)acrylate resin and a photo polymerization initiator. As the result of the very fact that the epoxy(meth)acrylate resin included in the adhesive composition as the main ingredient contains fluorine atoms, it forms a cured product having a lower refractive index as compared to those of the conventional adhesive compositions mainly composed of ordinary epoxy(meth)acrylate resins (containing no fluorine atoms) and thus improved remarkably in matching of the refractive index with those of the optical fibers and quartz glass.

In the fluorine-containing epoxy(meth)acrylate resin used in the adhesive composition of this invention, the fluorine-containing hydrocarbon $R_f$ is selected from the group consisting of $-\phi-C(CF_3)_2-\phi-$ (where $\phi$ stands for

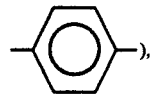

), $-C(CF_3)_2-\phi'-C(CF_3)_2-$ (where $\phi'$ stands for

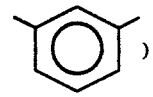

)

and $-CH_2(CF_2)_6CH_2-$.

The adhesive composition of this invention may be added with a compound acting as a photo polymerization initiator or a sensitizer, such as benzoin isobutyl ether, benzyl dimethyl ketal, benzoin ethyl ether, benzophenone or Michler's ketone, to form a photo-curable resin composition having an improved sensitivity to light. On the other hand, the storage stability of the adhesive composition may be improved by the addition of a radical polymerization inhibitor, such as quaternary ammonium chloride, benzothiazol, hydroquinone and methyl ether thereof or tert-butyl pyrocatechol.

It is also possible to add to the adhesive composition of the invention a radical polymerization initiator just prior to the use thereof the accelerate the curing reaction. The specific examples of such radical polymerization initiators conveniently added to the adhesive composition of the invention are peroxides such as benzyl peroxide, azo compounds such as azobisisobutyronitrile, and redox system initiators such as a combination of cumene hydroperoxide and an Fe(II) salt.

The present invention will be described more specificaly with reference to some Examples thereof. However, it is noted here that the invention should not be limited to the Examples given hereinafter.

Prior to the detailed description of the specific Examples, the abbreviated notations used for identifying the fluorine-containing epoxy(meth)acrylate resins used as the main ingredients will now be listed below.

(1) AFGA: Diglycidylacrylate of bisphenol-AF;

(2) AFGMA: Diglycidylmethacrylate of bisphenol-AF;

(3) BBGA: Diglycidylacrylate of 1,3-bis-(2-hydroxy 1,1,1,3,3,3-hexafluoropropyl)benzene;

(4) BBGMA: Diglycidylmethacrylate of 1,3-bis-(2-hydroxy-1,1,1,3,3,3-hexafluoropropyl) benzene;

(5) DOGA: Diglycidylacrylate of 2,2,3,3,4,4,5,5,6,6,7,7-dodecafluorooctane-1,8-diol; and (6) DOGMA: Diglycidylmethacrylate of 2,2,3,3,4,4,5,5,6,6,7,7-dodecafluorooctane-1,8-diol.

The abbreviated notations of the conventional epoxy(meth)acrylates used in the Comparative Examples are as follows:

(7) AGA: Diglycidylacrylate of bisphenol-A; and (8) BGA: Diglycidylacrylate of butane-1,4-diol.

EXAMPLE 1

Into a 500 ml volume three-neck flask provided with a thermometer, a stirrer and a reflux cooler, charged were 23 g of diglycidyl ether of bisphenol-AF (Epoxy Equivalent: 230), i.e. a fluorine-containing epoxy resin, 38 g of acrylic acid, 1.0 g of benzyltrimethylammonium chloride, 1.0 g of hydroquinone and 250 ml of toluene The contents in the flask was heated to 114° C. for 6 hours under agitation and under reflux. Thereafter, the the reaction system was subjected to distillation at reduced pressure to remove unreacted acrylic acid and toluene from the flask. The resultant reaction product was dissolved in ethyl ether. The thus obtained solution in ethyl ether was added with an aqueous solution of sodium carbonate to be neutralized. The ether phase was rinsed with a large volume of water and then separated from the water phase. The separated ether phase was added with anhydrous magnesium sulfate for drying. Ether was then distilled off from the solution to obtain 25 g of a transparent epoxyacrylate resin of feeble brown color.

The infrared absorption spectrum chart of the thus obtained product is shown in FIG. 1. As shown, absorption peaks at 3445 cm$^{-1}$ due to OH group, at 1725 cm$^{-1}$ due to C=O group of an ester bond, and at 1640 cm$^{-1}$ and 1400 cm$^{-1}$ due to vinyl group. The peak at 915 cm$^{-1}$ due to epoxy group found in the infrared absorption spectrum of the starting epoxy resin disappeared. The product prepared by this Example is represented by the following structural formula of:

$CH_2=C(CH_3)$-group. The absorption peak at 915 cm$^{-1}$ due to epoxy groups of the starting material epoxy resin disappeared. The thus prepared epoxymethacrylate resin, under the uncured condition, has a refractive index of $n_D^{20}=1.512$, and is represented by the following structural formula of:

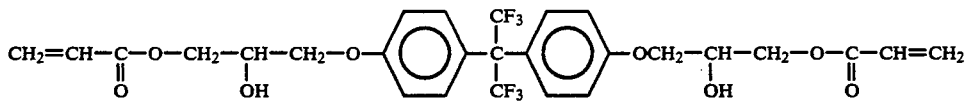

The thus synthesized epoxy acrylate resin was coated

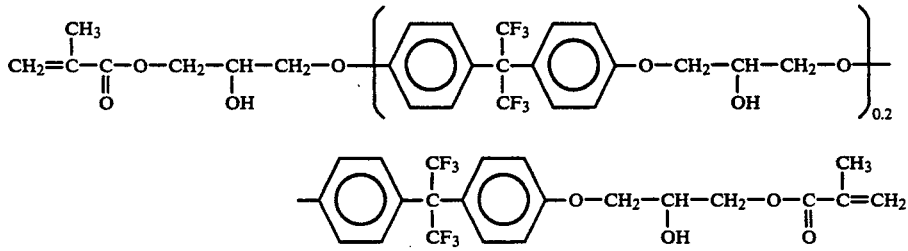

on a slide glass to from a 150μm thick coating which was then cured by irradiating with UV rays (26 mW/cm$^2$) from an ultra high pressure mercury lamp at room temperature. The change of the refractive index of the resin during the curing step was continuously observed. The refractive index reached a constant level after irradiating with the UV ray for 60 seconds. The refractive index ($n_D^{20}$) of the final cured mass was 1.525. The superscript 20 means that the refractive index was measured at 20° C., and the subscript D means that the wave length of the light used in the measurement was 589.3 nm (D-line of sodium).

EXAMPLE 2

Similarly as in Example 1, 30.2 g of a diglycidyl ether of bisphenol-AF (Epoxy Equivalent: 302, n=0.2, represented by the following structural formula), The thus synthesized epoxyacrylate resin was coated on a slide glass to form a 150μm thick coating which was then cured by irradiating with UV rays (26 mW/cm$^2$) at room temperature for 6 minutes. The coated film was completely cured thereby. The refractive index of the cured coating was $n_D^{20}=1.526$.

EXAMPLE 3

Into a three-neck-flask charged were 10.6 g of diglycidyl ether of 1,3-bis(2-hydroxy-1,1,1,3,3,3-hexafluoropropyl)benzene (Epoxy Equivalent: 280, n=0.1, $n_D^{20}=1.433$), 0.6 g of hydroquinone, 0.75 g of benzyltrimethylammonium chloride and 100 g of toluene, followed by reflux at 114° C. under vigorous agitation. A solution containing 14.4 g of acrylic acid dissolved in 15 g of toluene was added dropwise over a period of an hour. Then the content in the flask was refluxed for

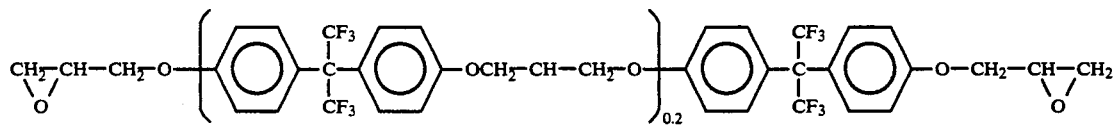

18.1 g of methacrylic acid, 2.0 g of benzyltrimethylammonium chloride, 1.0 g of hydroquinone and 150 ml of toluene were charged into a three-neck flask, and the mixture was refluxed under agitation at 114° C. for 5 hours. The reaction mixture was then subjected to distillation at reduced pressure to remove unreacted methacrylic acid and toluene. The resultant reaction product was added with ethyl ether to be dissolved therein. The thus obtained solution in ethyl ether was neutralized by adding with an aqueous solution of sodium hydroxide, and the ether phase was separated and then rinsed with a large volume of water. Anhydrous magnesium sulfate was added to the ether phase for drying purpose. Ether was then distilled off from the ether phase to obtain 30.0 g of a transparent epoxy methacrylate resin of feeble brown color.

The infrared absorption spectrum of the epoxy methacrylate resin had a peak at 1715 cm$^{-1}$ due to C=O group, of an ester bond, and a peak at 1640 cm$^{-1}$ due to additional 5 hours, and then subjected to distillation under reduced pressure to remove unreacted acrylic acid and toluene. The residue after distillation was dissolved in ethyl ether to obtain a solution which was neutralized with an aqueous solution of sodium hydroxide. The ether phase was separated and rinsed with distilled water for one time, and then rinsed with a saturated aqueous solution of sodium chloride for two times. After removal of ether by distillation, 7.2 g of transparent epoxy acrylate resin of feeble yellow color was obtained.

The infrared absorption spectrum of the thus prepared product had a peak at 1715 cm$^{-1}$ due to C=O group of an ester bond, and peaks at 1640 cm$^{-1}$ and 1410 cm$^{-1}$ due to vinyl group. The absorption peak at 915 cm$^{-1}$ due to epoxy groups of the starting material epoxy resin disappeared. The thus prepared epoxy acrylate resin, under the uncured condition, has a refractive index of $n_D{}^{20}=1.440$, and is represented by the following structural formula of:

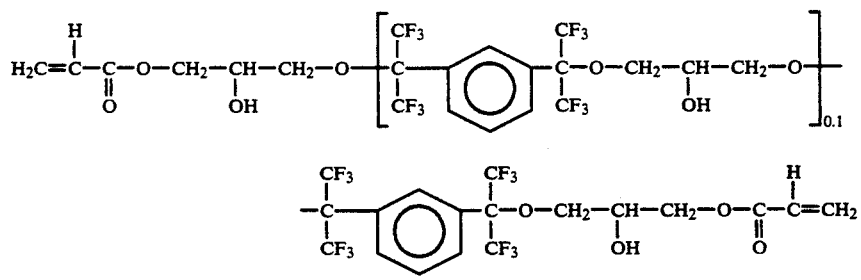

The thus synthesized epoxyacrylate resin was coated on a slide glass to form a 150 μm thick coating which was then irradiated with UV rays (26 mW/cm²) at room temperature for 4 minutes. The coated film was completely cured thereby. The refractive index of the cured coating was $n_D{}^{20}=1.454$.

EXAMPLE 4

Figure 2:
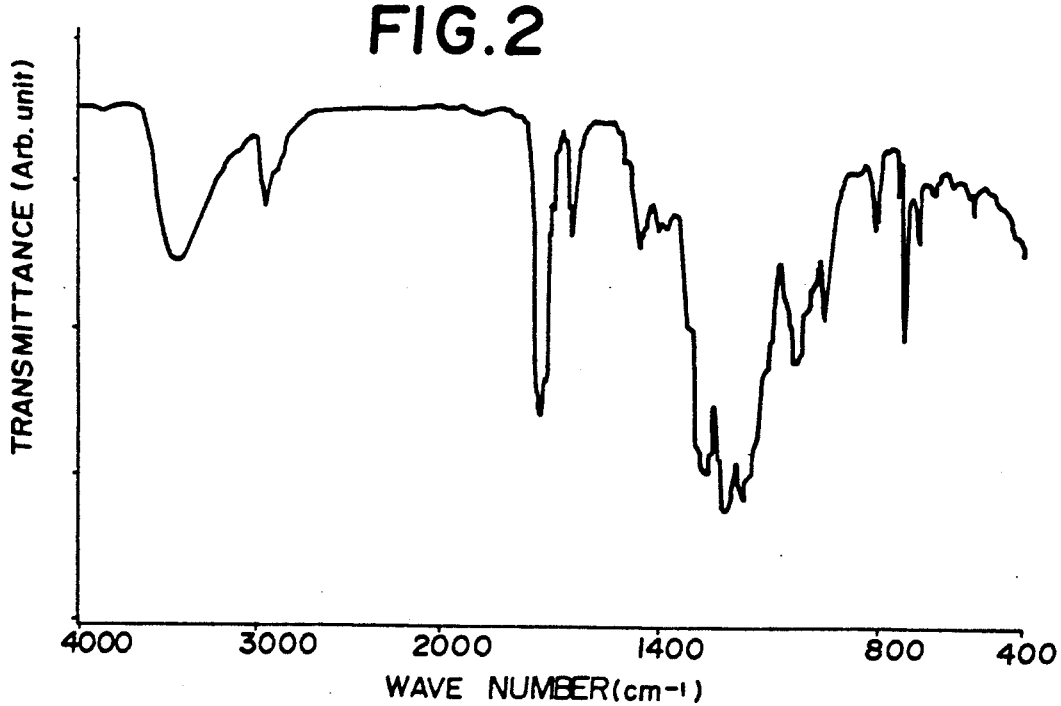
FIG. 2 is an infrared absorption spectrum chart of an epoxymethacrylate of 1,3-bis(2-hydroxy-1,1,1,3,3,3,-hexafluoropropyl)benzene (BBGMA)

Into a three-neck flask charged were 106 g of diglycidyl ether of 1,3-bis(2-hydroxy-1,1,1,3,3,3-hexafluoropropyl)benzene (Epoxy Equivalent: 280, n=0.1, $n_D{}^{20}=1.433$), 0.6 g of hydroquinone, 0.75 g of benzyltrimethylammonium chloride and 100 g of toluene, followed by heating to reflux at 114° C. under vigorous agitation. A mixture of 17.2 g of methacrylic acid and 25 g of toluene was dropwisely added into the flask over a period of an hour. After the completion of dropwise addition of methacrylic acid, the contents in the flask was heated to reflux for additional 5 hours, and then subjected to the treatments similar to those as described in Example 3. As a result, 7.8 g of a transparent epoxymethacrylate resin of feeble yellow color was obtained. The infrared absorption spectrum of the thus obtained product is shown in FIG. 2 which shows a peak at 1715 cm⁻¹ due to C=O group of an ester bond, and peak at 1640 cm⁻¹ due to CH₂=CCH₃—group. The absorption peak at 915 cm⁻¹ due to epoxy groups of the starting material epoxy resin disappeared. The thus prepared epoxyacrylate resin, under the uncured condition, has a refractive index of $n^{20}=1.443$, and is represented by the following structural formula of:

The thus synthesized epoxymethacrylate resin was coated on a slide glass to from a 150 μm thick coating which was then irradiated with UV rays (26 mW/cm²) at room temperature for 6 minutes. The coated film was completely cured thereby. The refractive index of the cured coating was $n_D{}^{20}=1.457$.

EXAMPLE 5

Figure 3:
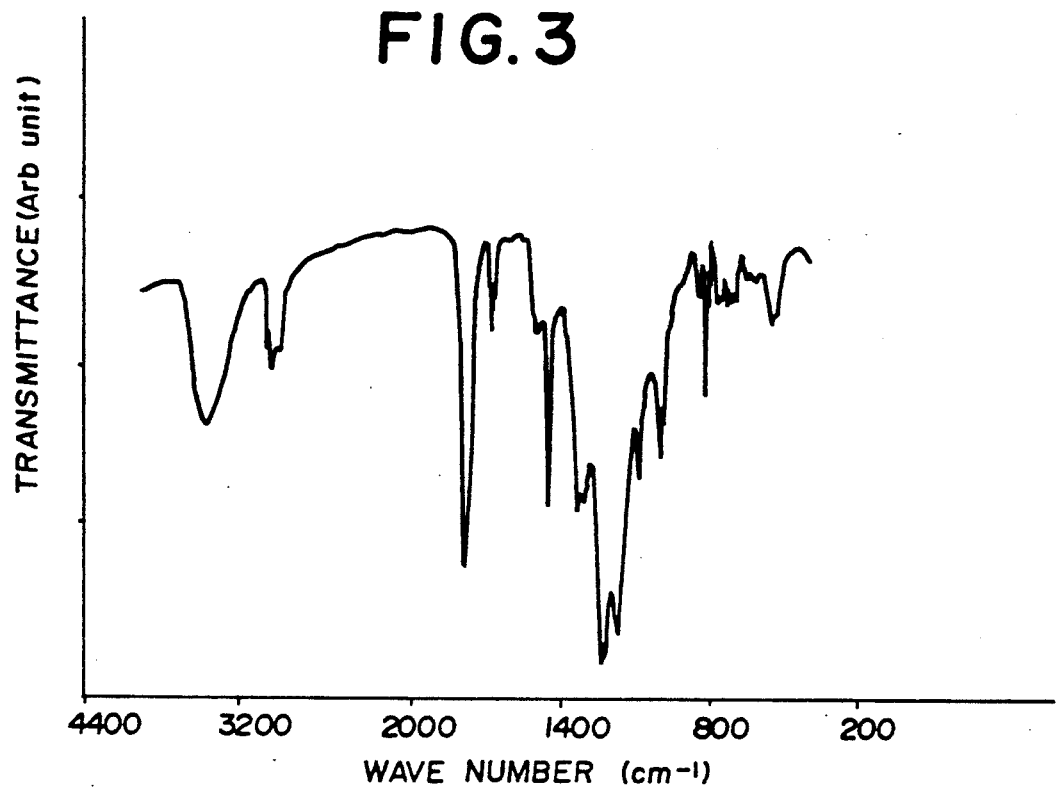
FIG. 3 is an infrared absorption spectrum chart of an epoxymethacrylate of 2,2,3,3,4,4,5,5,6,6,7,7,-dodecafluorooctane-1,8-diol (DOGA)

Into a three-neck flask charged were 26 g of a diglycidyl ether of 2,2,3,3,4,4,5,5,6,6,7,7-dodecafluoro-octane-1,8-diol (Epoxy Equivalent: 260, n=0.1), 12 g of acrylic acid, 0.3 g of tetrabutyl ammonium bromide, 0.3 g of hydroquinone and 50 ml of toluene. Following procedures were similar to these as described in Example 1 to obtain 18.4 g of an epoxyacrylate resin. The infrared absorption spectrum of the product was shown in FIG. 3 which shows a peak at 1715 cm⁻¹ due to C=O group of an ester bond, and peaks at 1640 cm⁻¹ and 1410 cm⁻¹ due to vinyl group. The structural formula of the product will be given below.

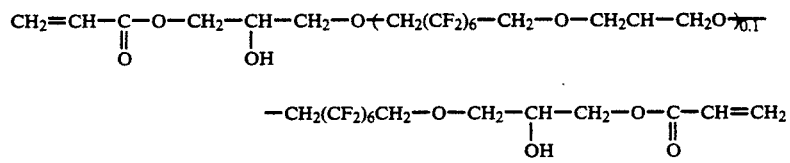

The product was irradiated with an UV ray similarly as described in Example 1. The product resin was completely cured by irradiation for 60 seconds. The refractive index of the cured mass ($n_D{}^{20}$) was 1.434.

EXAMPLE 6

Similarly as in Example 5, 26 g of a diglycidyl ether of 2,2,3,3,4,4,5,5,6,6,7,7-dodecafluorooctane-1,8-diol (Epoxy Equivalent: 260, n=0.1), 18.1 g of methacrylic acid, 0.5 g of tetrabutylammonium bromide, 1.0 g of hydroquinone and 100 ml of toluene were charged in a three-neck flask, followed heating to reflux the content in the flask. 15.6 g of an epoxymethacrylate was ob-

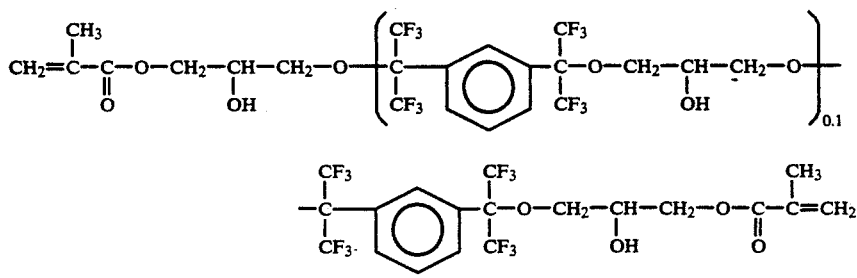

tained. The infrared absorption spectrum of the product epoxymethacrylate had an absorption peak at 1720 cm$^{-1}$ due to c=O group of an ester bond and another absorption peak at 1630 cm$^{-1}$ due to CH$_2$=C(CH$_3$)— group; and the absorption peak at 905 cm$^{-1}$ due to the epoxy groups in the starting material epoxy resin, the diglycidyl ether of dodecafluorooctane-1,8-diol, disappeared. The product is represented by the following structural formula of:

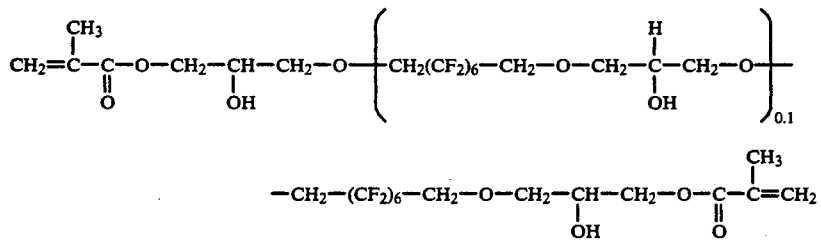

The uncured product had a refractive index (n$_D^{20}$) of 1.418, and it was irradiated with UV rays similarly as in Example 5. to be completely cured within 60 seconds. The refractive index of the cured mass was n$_D^{20}$=1.437.

EXAMPLE 7

The refractive indices of the uncured fluorine-containing epoxy(meth)acrylate resins prepared by Examples 1 to 6 (n$_D^{20}$, the superscript 20 indicates the temperature at which the measurement of refractive index was conducted and the subscript D indicates that the D-line of sodium having a wave length of 589.3 nm was used in the measurement) are shown in the following Table 1. Meanwhile, it is noted here that the refractive indices of the fluorine-containing epoxy(meth)acrylate resins increase after curing because of the increase in density caused by shrinkage during the curing step.

TABLE 1

| Uncured Fluorine-containing Epoxy(meth)acrylate Resin | Refractive Index n$_D^{20}$ |
|---|---|
| AFGA | 1.512 |
| AFGMA | 1.512 |
| BBGA | 1.440 |
| BBGMA | 1.443 |
| DOGA | 1.416 |
| DOGMA | 1.418 |
| AGA | 1.542 |
| BGA | 1.488 |

The irradiation dose dependency of the curing reaction of a base AFGA resin was examined by varying the added amount of benzoin isobutyl ether (hereinafter simply referred to as "BBE") acting as a photo polymerization initiator. The irradiation dose dependencies of the curing reactions of the remained adhesive compositions when irradiated with varying dosage of an UV ray were determined by a Gray Scale Method while using Step Tablet No. 2 produced by Eastman Kodak Co. (In this connection, reference should be made to L. M Minsk et. al., J. Appl. Poly. Sci., 2, No.6, 302 to 307 (1959).) The thickness of the resin coating was 75 μm, and toluene was used as the developer.

The developed composition layer on each of the coatings applied on a glass plate was examined by using a surface roughness tester to know the residue index indicating the rate of residual coating in micron of the cured coating. In FIGS. 4 to 7, the abscissa shows the irradiation amount or dose of UV rays having a wave length of from 320 to 400 nm per a unit area of the coating surface, and the ordinate shows the residue index.

Figure 4:
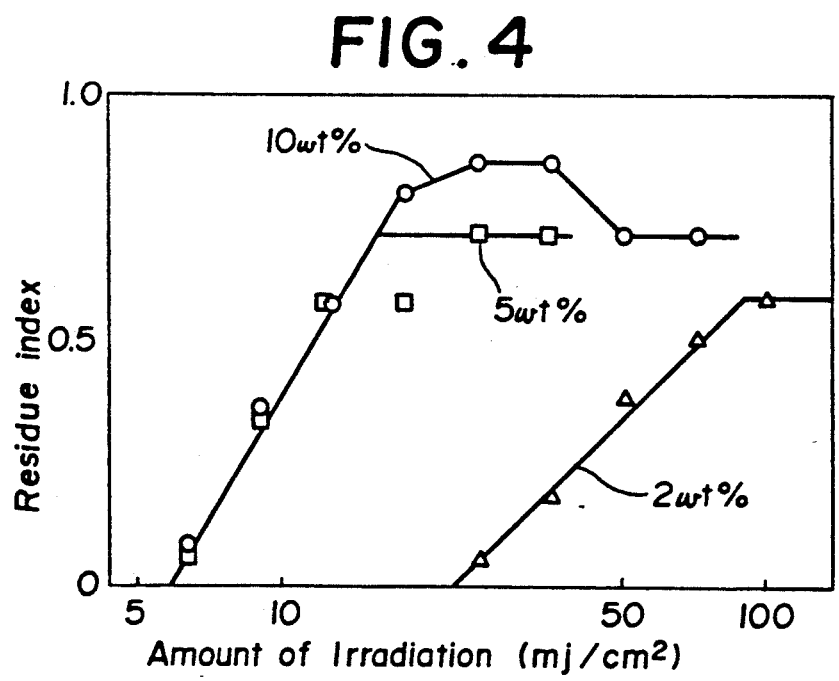
FIGS. 4 to 7 are graphs showing the changes in residue index in terms of the change in amount of irradiation when adhesive compositions of the invention are irradiated with UV rays.

In FIG. 4, the polygonal line plotting the marks Δ shows the result of a sample comprising AFGA added with 2 wt % of BBE, the polygonal line plotting the marks □ shows the result of a sample comprising AFGA added with 5 wt % of BBE, and the polygonal line plotting the marks ○ shows the result of a sample comprising AFGA added with 10 wt % of BBE.

The curing reaction of AGFA was considerably accelerated by the addition of BBE. The sensitivities of the compositions of the UV ray were also improved considerably. It has been found that the effect obtainable by the addition of BBE is significantly high until the amount of added BBE is increased to 5 wt %.

Figure 5:
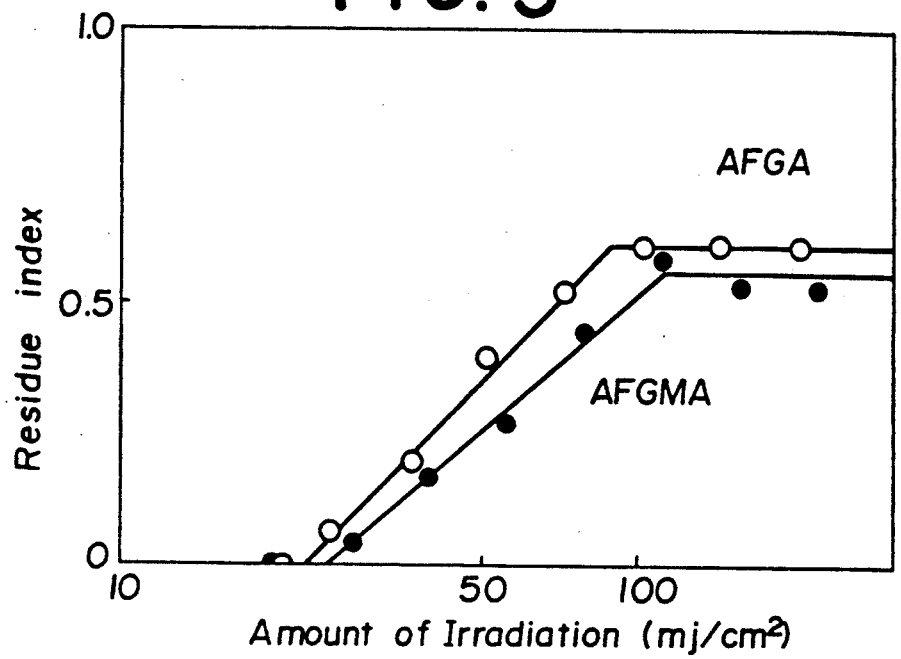

FIG. 5 shows the results of the irradiation dose dependencies, measured generally similar to the method as aforementioned, of the residue indices of an epoxyacrylate resin composition and of an epoxymethacrylate resin composition prepared, respectively, from AFGA and AFGMA added with 2 wt % of BBE according to this invention. In FIG. 5, the polygonal line plotting the marks ○ shows the result of the composition prepared from AFGA, whereas the polygonal line plotting the marks ● shows the composition prepared from AFGMA. The results show that the epoxyacrylate resin base composition has a higher sensitivity than the epoxymethacrylate resin base composition and is thus cured more rapidly.

Figure 6:
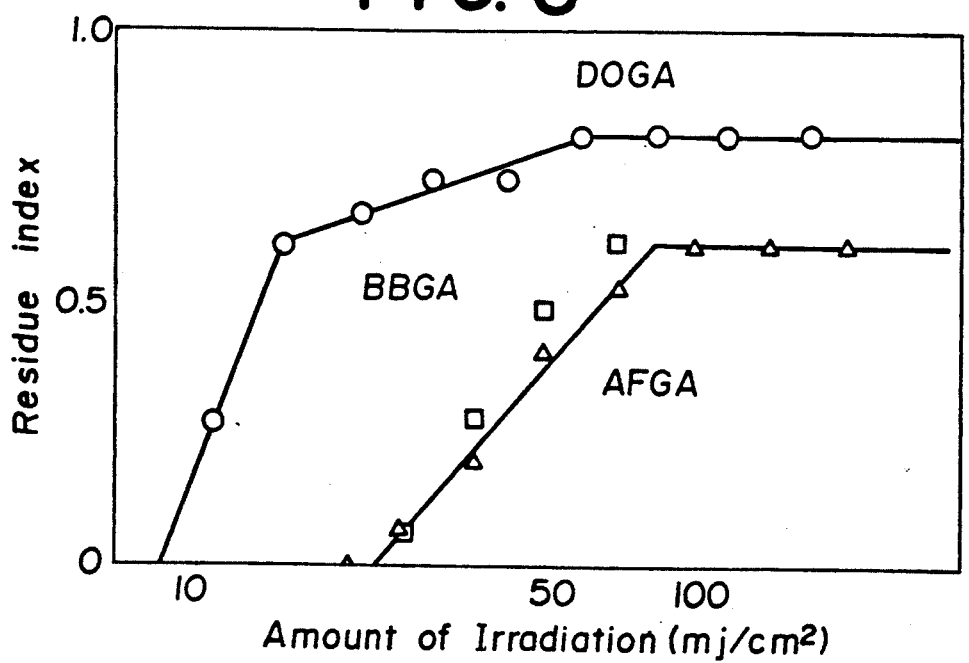

FIG. 6 shows the results of the irradiation dose dependencies, measured generally similar to the method as aforementioned, of the residue indices of the compositions prepared by adding 2 wt % of BBE to AFGA, BBGA and DOGA having different fluorine-containing hydrocarbons Rf. In FIG. 6, the polygonal line plotting the marks Δ shows the result of the composition prepared from AFGA, the polygonal line plotting the marks □ shows the result of the composition prepared from BBGA, and the polygonal line plotting the marks ○ shows the result of the composition prepared from DOGA. The results show that the DOGA base composition has the highest sensitivity, and the AFGA base and the BBGA base compositions have substantially equivalent sensitivities. All of the three compositions had been cured completely by dosing with an irradiation amount of 100 mJ/cm$^2$.

Figure 7:
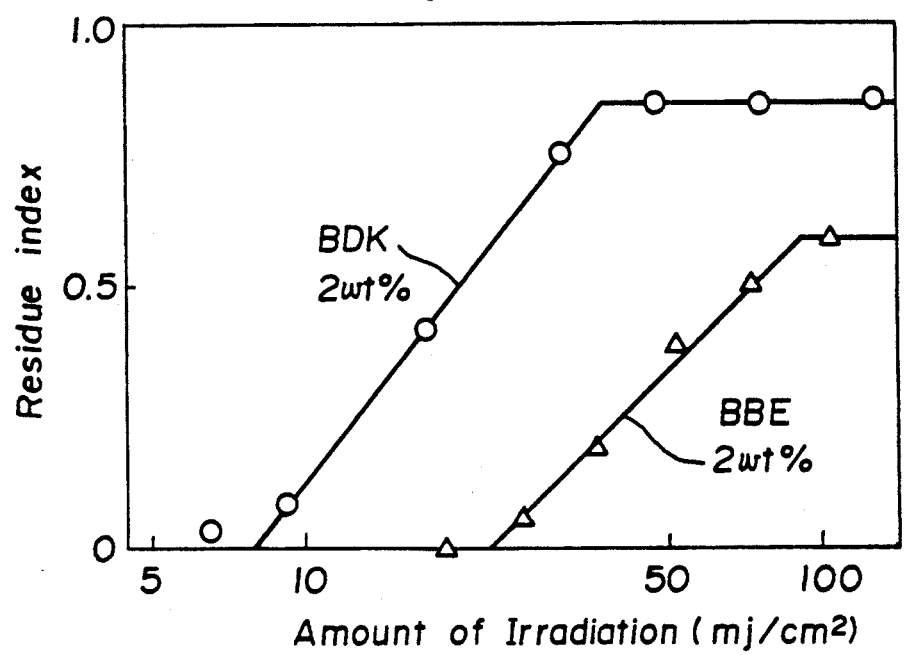

FIG. 7 shows the results of the irradiation dose dependencies of the residue indices of the compositions prepared by using an AFGA base resin added with 2 wt % of benzyl methyl ketal (BDK) in place of BBE. For the comparison purpose, the result obtained by adding with 2 wt % of BBE is shown in the Figure. As should be apparent from the results shown in FIG. 7, the curing reaction of AFGA was accelerated considerably by the addition of BDK, together with remarked improvement in sensitivity to UV rays.

EXAMPLE 8

The adhesive strengths, refractive indices and the values of Tg of the cured masses of adhesive compositions prepared by using the fluorine-containing epoxy(meth)acrylate resins, as described in Examples 1 to 6, were measured after they were cured by exposure to UV ray irradiation. The adhesive strength was measured by using BK7 glass plates as the test plates to be bonded by the adhesive compositions. Each of the adhesive compositions was applied on either one of the two BK7 glass plates, each having a thickness of 5 mm, a length of 30 mm and a width of 20 mm, and the two BK7 glass plate were overlapped, with the area applied with each adhesive composition and sandwiched between the plates being a rectangular region of 20 mm (width)×10 mm (length). The adhesive tensile shear strength between the thus bonded glass plates was measured by using a tensile testing machine at a shearing of 1 mm/min and at a temperature of 23° C.

The refractive index was measured by preparing a plate-shape cured sample of each adhesive composition, and then the refractive index of the sample was measured at a temperature of 20° C. using an Abbe's refractometer. The light used in the measurement of refractive index was the D-line of sodium having the average wave length of 589.3 nm.

The glass transition temperature Tg was measured by using a visco-elastometer.

All of the samples subjected to tests were prepared by exposing respective adhesive compositions at the room temperature for 10 minutes to an UV irradiation (26 mW/cm$^2$) from an ultra high pressure mercury lamp.

The properties of the aromatic epoxy(meth)acrylate resin base adhesive compositions of the invention are shown in Table 2, together with the properties of a Comparative Example prepared from diglycidyl acrylate of bisphenol A (AGA) containing no fluorine atom.

TABLE 2

| Example No. | Used Resin | Adhesive Tensile Shear Strength (kgf/cm$^2$) | Refractive Index (n$_D^{20}$) | Tg (°C.) |
|---|---|---|---|---|
| 1 | AFGA | 45 | 1.525 | 93 |
| 2 | AFGMA | 53 | 1.526 | 90 |
| 3 | BBGA | 70 | 1.454 | 86 |
| 4 | BBGMA | 73 | 1.457 | 82 |
| Comp. Ex. | AGA | 60 | 1.565 | 92 |

Note: Each of the adhesive compositions contained 2 wt % of BBE.

Example Nos. 1 to 4 have the refractive indices smaller than the refractive index of the Comparative Example. Since the adhesive compositions of the invention have fair adhesive properties and acceptable Tg generally equivalent to those of the Comparative Example to reveal the utilities thereof as adhesive compositions having low refractive indices.

The properties of the non-aromatic epoxy(meth)acrylate resin base adhesive compositions of the invention, which are prepared from DOGA and DOGMA, are shown in Table 3, together with the properties of a Comparative Example prepared from diglycidyl acrylate of butanediol (BGA).

TABLE 3

| Example No. | Used Resin | Adhesive Tensile Shear Strength (kgf/cm$^2$) | Refractive Index (n$_D^{20}$) | Tg (°C.) |
|---|---|---|---|---|
| 5 | DOGA | 25 | 1.434 | 39 |
| 6 | DOGMA | 30 | 1.437 | 37 |
| Comp. Ex. | BGA | 23 | 1.503 | 29 |

Note: Each of the adhesive compositions contained 2 wt % of BBE.

Both of Examples 5 and 6 have the refractive indices lower than that of the BGA base Comparative Example, and have higher Tg values. It will be readily seen from the results that the fluorine-containing epoxy(meth)acrylate resin base adhesive compositions, according to the invention, are improved also in their adhesive strengths to be more conveniently used as the adhesive compositions for glasses.

EXAMPLE 9

Figure 8:
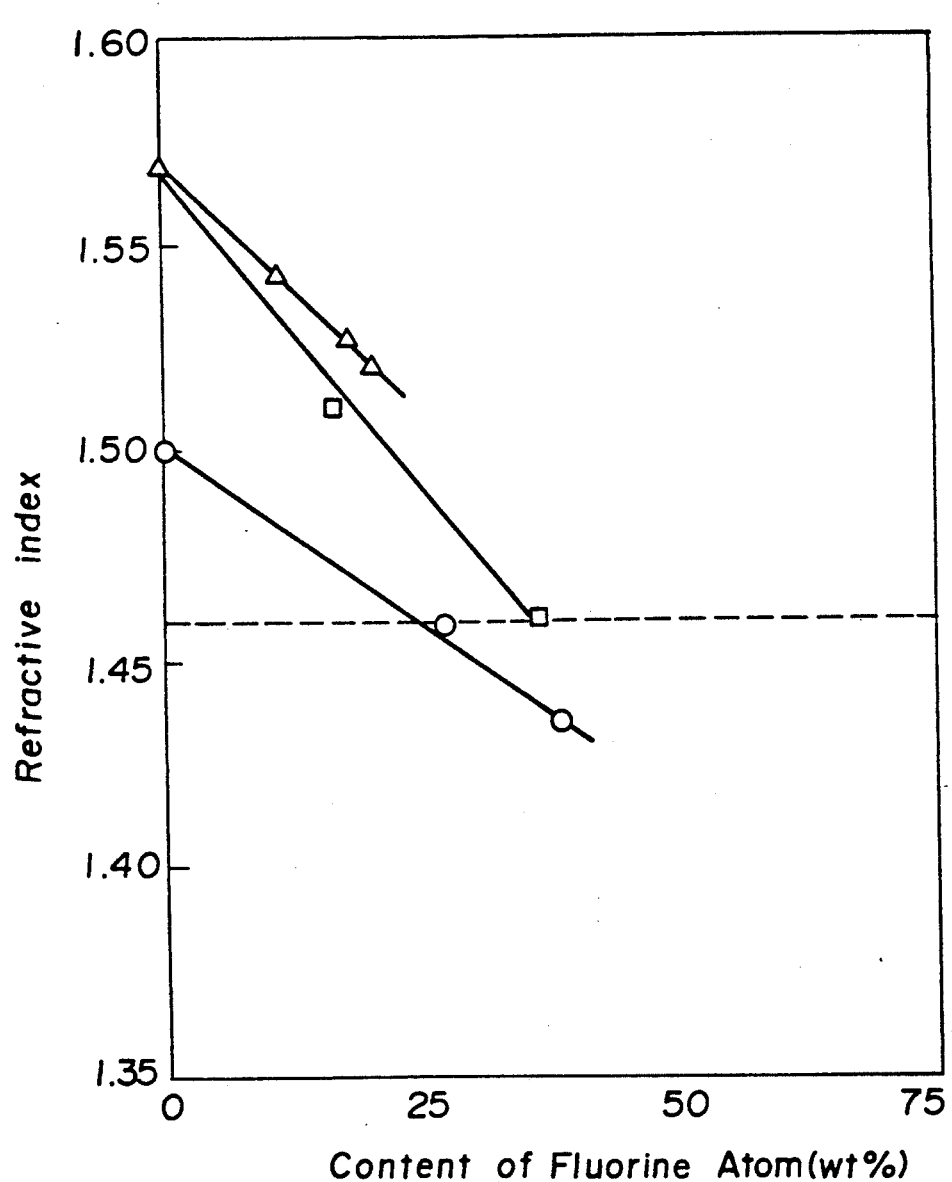
FIG. 8 is a graph showing the refractive indices vs. contents of fluorine of some examples of the invention.

The fluorine-containing epoxy(meth)acrylate resins were mixed with AGA and OGA and further added with 2 wt % of BBE acting as a photo polymerization initiator, and the admixtures were cured by irradiating with UV rays. FIG. 8 shows the changes in refractive index of respective cured masses calibrated on the abscissa in terms of the content of fluorine in each admixture calibrated on the ordinate. In FIG. 8, the polygonal line plotting the marks Δ shows the result of the admixture of AFGA and AGA, the polygonal line plotting the marks ◯ shows the result of the admixture of DOGA and BGA, and the polygonal line plotting the marks □ shows the result of the admixture of BBGA and AGA.

The results shown in FIG. 8 clearly reveal that the fluorine-containing epoxy(meth)acrylate resins may be admixed with other ingredients, such as AGA and BGA, to form admixtures having controlled refractive indices ranging within 1.434 to 1.565. It should be, therefore, apparent that an adhesive composition having a refractive index well matched with that of any material for optical members, including quartz and quartz glass fiber having a refractive index of from 1.46 to 1.48 and the BK7 glass having a refractive index of 1.516, can be prepared, with additional merits that the adhesive composition of the invention can be cured rapidly at room temperature.

EXAMPLE 10

Figure 9:
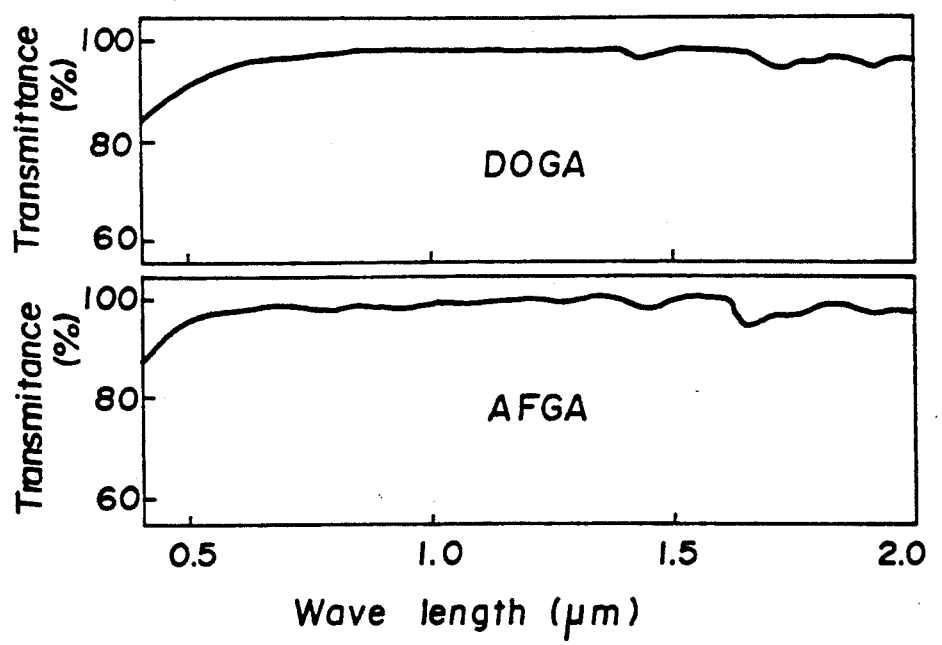
FIG. 9 shows the wave length dependency of transmittances of the cured masses of AFGA and DOGA prepared in accordance with the invention.

AFGA base and DOGA base compositions added, respectively, with 2 wt % of BBE were exposed to an UV ray irradiation. The wave length dependencies of the transmittances of the used masses are shown in FIG. 9.

The thickness of each cured mass was 150 μm Both adhesive compositions have high transmittances of higher than 95% over a wide wave length range of from 0.6 to 1.4 μm, to reveal that they have excellent transparency within a wide range.

The similar experiments had been conducted by using AFGMA, BBGA, BBGMA and DOGMA in place of AFGA and DOGA. Equivalent results were found to reveal excellent transparency of the adhesive compositions of the invention.

Although the invention has been described with reference to presently preferred embodiments thereof, it is to be noted that the invention should not be limited only to the embodiments specifically described, by way of example. Many alternations, modifications and equivalents thereof can be readily seen by those skilled in the art without departing from the broad scope of the invention defined in the appended claims. It is thus intended to include all such alternations, modifications and equivalents within the scope of the present invention.

What is claimed is:

1. An adhesive composition comprising a fluorine-containing epoxy(meth)acrylate resin of the formula:

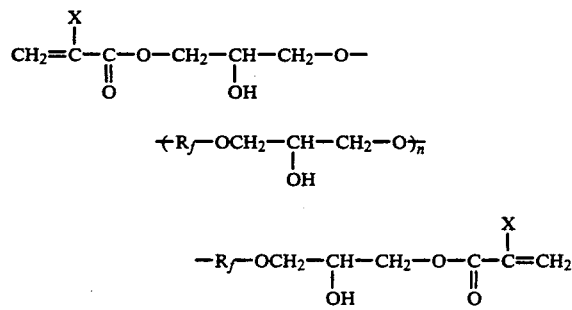

wherein $R_f$ is a member selected from the group consisting of $-\phi-C(CF_3)_2-\phi-$, in which $\phi$ represents

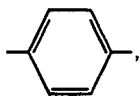

and $-CH_2(CF_2)_6CH_2-$; n is zero or a positive integer up to a value which results in a cured adhesive product which has a refractive index $N_D^{20}$ ranging from 1.434 to 1.532; and X is hydrogen or methyl, and from 2 to 10% by weight, based on the amount of said fluorine-containing epoxy(meth)acrylate resin, of a photopolymerization initiator which is a member selected from the group consisting of benzoin butyl ether, benzyl dimethyl ketal, benzoin ethyl ether, benzophenone and Michler's ketone.

2. The adhesive composition as claimed in claim 1, wherein the mixture of said fluorine-containing epoxy(meth)acrylate resin and said photopolymerization initiator is cured by exposure to UV radiation having a wavelength ranging from 320 to 400 nm at room temperature for 1 to 10 minutes.

* * * * *